United States Patent Office 2,837,500
Patented June 3, 1958

2,837,500

COPOLYMERS OF ACRYLONITRILE WITH ALKENYLAROMATIC SULFONIC ACIDS OR SALTS

Raymond Joseph Andres and Wilfred Sweeny, Wilmington, Del., assignors to E. I. du Pont de Nemours & Company, Wilmington, Del., a corporation of Delaware No Drawing. Application August 3, 1953
Serial No. 372,182

9 Claims. (Cl. 260—79.3)

This invention relates to the preparation of new polymers. More particularly, it relates to new polymers which contain sulfonic acid or sulfonate groups.

In the manufacture of shaped articles, such as fibers and films, consideration must be given to the processing steps which are to be taken by the various users of the articles. For example, fibers are generally subjected to dyeing treatments in the conversion of the fibers to clothing articles. Polymers which are readily dyeable have a distinct advantage over polymers which are comparable in all other respects but do not dye easily.

In the field of agriculture, soil conditioners are of considerable interest. Low cost materials are in particular demand.

An object of this invention is to produce new polymers, a further object is to produce polymers having a variety of applications. One object is to produce polymers which are readily dyeable. A further object is to produce polymers which can be converted into shaped articles which in turn are easily dyed to uniform shades. Another object is the provision of new soil conditioning agents. A still further object is the provision of polymers containing sulfonic acid or sulfonate groups. Other objects will appear hereinafter.

The objects of this invention are accomplished by the polymerization of sulfoarylethylenes or salts thereof either alone or with other copolymerizable monomers. The sulfoarylethylene compound may bear the sulfonic acid group in different positions on the aryl radical; generally the aryl group is phenyl and the ortho or the para compound is used:

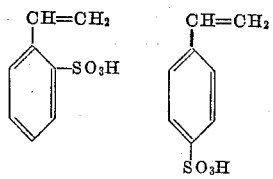

On polymerization of a sulfoarylethylene alone a homopolymer is produced. Copolymers can be made with a wide variety of copolymerizable monomers. On the polymerization of the sulfoarylethylene alone or with other monomers, polymers having sulfonate groups definitely and substantially uniformly distributed therein are produced. This uniform distribution and definite location of the sulfo group is highly advantageous and the polymers of this invention have outstanding properties, as described hereinafter, which make these polymers of considerable value.

The following examples, in which parts and percentages are by weight unless otherwise specified, are given for illustrative purposes only and are not limitative.

*Example I*

One thousand parts of beta-phenylethyl bromide was added dropwise over 1 hour with stirring at 20° C. to chlorosulfonic acid (2000 parts). After stirring for 1 hour more at the same temperature, the solution was poured into ice and the solid precipitate washed twice with ice water (3000 parts each time). The residue was suspended in water (1000 parts) and heated with stirring on a steam bath while a concentrated aqueous solution of potassium carbonate was added to maintain the pH at 7 or lower. When the pH began to rise to about 7-8, the solution was filtered and then cooled to 0° C. The solid which separated was filtered. The filtrate was evaporated to dryness under reduced pressure, and the residue and that from the filtrate were combined and dried under vacuum. The potassium beta-bromoethylbenzenesulfonate so obtained was characterized by elemental analysis and by analysis of its S-benzylisothiouronium salt, M. P. 149–150° C. The dried salt was finely powdered and was then heated under reflux with stirring for 1 hour in a solution of potassium hydroxide (300 parts) in methanol (2500 parts). Carbon dioxide was added to pH of 8 and the mixture was filtered hot. The residue was further extracted with boiling methanol and the total extract was cooled to −20° C. and filtered to give 415.5 parts of product. Concentration of the mother liquor gave a further 194.0 parts making 609.5 parts in all, being 50.5% of the theoretical yield. By bromine addition the product was analyzed as 75–80% pure. The potassium vinylbenzenesulfonate was characterized by elemental analysis of its S-benzylisothiouronium salt, M. P. 143–144° C.

| Analysis | C | H | N | S |
|---|---|---|---|---|
| Potassium beta-bromoethylbenzenesulfonate (PBBS): | | | | |
| Found | 31.5 | 2.6 | | 10.6 |
| Requires | 31.7 | 2.6 | | 10.6 |
| S-benzylisothiouronium salt of PBBS: | | | | |
| Found | 45.0 | 4.4 | 6.6 | |
| Requires | 44.6 | 4.4 | 6.5 | |
| S-benzylisothiouronium salt of vinylbenzenesulfonic acid: | | | | |
| Found | 54.95 | 5.0 | 8.0 | 18.3 |
| Requires | 54.9 | 5.0 | 8.0 | 18.3 |

Fractionation of the crude salt using alcohol gave the three fractions: a more soluble fraction, a less soluble fraction and an intermediate fraction. Infrared examination of the mixture indicated the presence of about 60–75% of the para isomer and 40–25% of the ortho. These isomers may be separated or they may be used together as prepared.

The homopolymer of either 2-vinylbenzenesulfonic acid, 4-vinylbenzenesulfonic acid or mixtures thereof can be prepared as follows:

To a solution of potassium 4-vinylbenzenesulfonate (10 parts) in distilled deaerated water (75 parts) were added potassium peroxydisulfate (0.075 part) and sodium bisulfite (0.04 part). The air above the solution was displaced by nitrogen and polymerization continued at 40° C. for 16 hours. A viscous solution was obtained from which the inorganic salts could be removed by dialysis through cellophane. Reconcentration of the solution to its original volume and addition to acetone (270 parts) gave poly-(para-sulfophenyl) ethamer. Osmotic pressure measurements in 0.1 N KCl solution indicated that the molecular weight was not less than 40,000. The polymeric salt can be used as such or if the polymeric acid is desired, conversion is readily made by treating the salt with an acid such as hydrochloric acid.

If 2-vinylbenzenesulfonic acid is polymerized, the polymer produced is poly-(ortho-sulfophenyl) ethamer. Polymerization of the mixture obtained in the monomer preparation produced a copolymer. The process can be made to produce poly-(meta-sulfophenyl) ethamers also.

Example II

A typical 2% potassium 4-vinylbenzenesulfonate/acrylonitrile copolymer was made as follows: A solution was formed using distilled deaerated water (1450 parts), potassium 4-vinylbenzenesulfonate (2 parts), 5% acetic acid (5 parts) and acrylonitrile (98 parts).

The solution was stirred at 40° C. under nitrogen, and to it was added all at once a mixture of potassium peroxydisulfate (3.2 parts), sodium bisulfite (1.6 parts) and distilled water (50 parts).

Polymerization was continued for 1 hour under nitrogen at 40° C.; the polymer was then filtered, was washed three times with distilled water using 2000 parts of water each time, and was dried at 60° C. under vacuum. The yield of polymer was 81.0 parts. Sulfur analysis, making a correction for the sulfur originating in the catalyst, indicated that the polymer contained more than 2% of residue derived from potassium 4-vinylbenzenesulfonate.

In a similar manner copolymers of acrylonitrile with 2-vinylbenzenesulfonic acid or 3-vinylbenzenesulfonic acid or their water-soluble salts can be produced. Likewise, the mixture of the ortho and para isomers described in Example I can be polymerized to a copolymer by the procedure described in this example.

Example III

A polymer of acrylonitrile and sodium vinylbenzenesulfonate was prepared as follows: A solution was made up of distilled deaerated water (1500 parts), sodium vinylbenzenesulfonate (4 parts) and acrylonitrile (96 parts). The solution was stirred at 40° C. under nitrogen and the catalyst/activator solution from 2.8 parts of potassium peroxydisulfate, 1.4 parts of sodium bisulfite and 40 parts of distilled water was added all at once.

Polymerization was continued for 2 hours under nitrogen with stirring. The polymer was then filtered, washed with distilled water (3 times with 1000 parts each time) and dried. The yield was 82% of the theoretical.

By sulfur analysis it was determined that 4.5–5% of the polymer was derived from sodium vinylbenzenesulfonate.

In this example the sulfonate monomer was a mixture of the 4-vinyl- and 2-vinylbenzenesulfonic acids (as their sodium salts), and the polymer produced is a terpolymer. Copolymers of either of these sulfophenylethylenes or their sodium salts are easily made with acrylonitrile by following the process of this example.

Example IV

The recipe used for this polymerization was as follows:

| | Parts |
|---|---|
| Deaerated distilled water | 50 |
| Sodium "Lorol" sulfate | 0.5 |
| Potassium vinylbenzenesulfonate | 2.8 |
| Methyl methacrylate | 22 |

The mixture was sealed under nitrogen in a pressure bottle with potassium peroxydisulfate (0.10 part) and sodium bisulfite (0.05 part) and polymerization continued with shaking at 60° C. for five hours. The thick white dough which was obtained was washed with alcohol in order to complete agglomeration. The polymer was then well shredded and washed with distilled water (3 times with 1 liter each time) and air dried. The yield was 23 parts of product. By analysis the product contained 10% of potassium vinylbenzenesulfonate.

Example V

The following recipe was used:

| | Parts |
|---|---|
| Distilled deaerated water | 1450 |
| Potassium vinylbenzenesulfonate | 10 |
| Acrylonitrile | 90 |

After stirring this mixture under nitrogen five minutes, a solution of potassium peroxydisulfate (3.4 parts) and sodium bisulfite (1.7 parts) in distilled water (50 parts) was added, and the polymerization was continued at 40° C. under nitrogen for 1.5 hours. The polymer was collected by filtering, washed with distilled water (3 times with 2 liters each time) and acetone (1 liter) and then was dried at 60° C. under vacuum. The yield was 88.5% and by analysis the polymer was derived from about 10% by weight of the vinylbenzenesulfonate.

Example VI

The following mixture was polymerized at 40° C. under nitrogen for 20 hours:

| | Parts |
|---|---|
| Deaerated distilled water | 150 |
| Sodium "Lorol" sulfate | 0.8 |
| Potassium vinylbenzenesulfonate | 4 |
| Methylene bisacrylamide | 1 |
| Acrylonitrile | 5 |
| Potassium peroxydisulfate | 0.1 |
| Sodium bisulfite | 0.05 |

The dispersion was then filtered and evaporated to dryness under reduced pressure. The residue was extracted with hot methanol, using three 1-liter portions, in order to remove the "Lorol" sulfate. The residue was then washed with distilled water and air dried. The yield was 60% and by analysis the product contained 58% of potassium vinylbenzenesulfonate.

Example VII

That the salts of vinylbenzenesulfonic acid copolymerize well with acrylonitrile in higher amounts is indicated in this example. The following mixture was prepared: distilled deaerated water (375 parts), sodium "Lorol" sulfate (2 parts; this is a mixture of sulfates from aliphatic alcohols containing from 10 to 14 carbon atoms), sodium vinylbenzenesulfonate (3.5 parts), cyclohexane (19.5 parts), ethylenebismethacrylate (2 parts) and acrylonitrile (16 parts).

The mixture was stirred at 40° C. under nitrogen and potassium peroxydisulfate (0.15 part) and sodium bisulfite (0.075 part) were added. After 18 hours the mixture was evaporated to dryness under reduced pressure, and the residue was washed with water (2 times with 1000 parts each time), hot methanol (600 parts) and air dried. The yield of product was 13.9 parts. Sulfur analysis indicated that the product contained 19% sodium vinylbenzenesulfonate.

The salts of vinylbenzenesulfonic acid are very active towards polymerization and their tendency to polymerize is greater than that of any previously studied sulfonic acids or their salts, such as allyl-, ethylene- or methallylsulfonic acids. For example, in carring out polymerizations as in Examples II and III but replacing the vinylbenzenesulfonic acid salts with other sulfonic acids the following results were obtained:

A. 8% ammonium ethylenesulfonate in the charge gave a polymer of which only 3.3% was derived from the sulfonic acid salt.

B. 6% sodium methallylsulfonate in the charge gave a polymer of which only 3—3.5% was derived from sodium methallylsufonate.

C. 6% sodium allylsulfonate in the charge gave a polymer with only 2% sodium allylsulfonate polymerized therein.

D. 10% sodium propene-1-sulfonate in the charge gave a polymer of which less than 1% was derived from propenesulfonate.

The above examples show how well the potassium vinylbenzenesulfonate copolymerizes, and this is unlike any previously known sulfonic acids or salts thereof. For example, in preparing copolymers of ammonium ethylenesulfonate with acrylonitrile, in which preparation the charge contained 8% ammonium ethylenesulfonate, the product had only 3.3% of the sulfonic acid salt.

Similarly, a polymer prepared from 6% sodium methallylsulfonate gave a polymer which contained only 3–3.5% of the sodium methallylsulfonate.

The above data show that when comparable amounts of sulfonic acids are used more vinylbenzenesulfonate appears in the polymer than appears when any of the other sulfonates are used. Thus, smaller amounts of the vinylbenzenesulfonate can be used effectively; more of the less active sulfonate monomers are required to get comparable amounts of sulfonate introduction into a polymer.

The polymerization activity is also shown in Example VIII.

*Example VIII*

A series of acrylonitrile/potassium vinylbenzenesulfonate copolymers were prepared. In all cases the polymer contained at least the same percent vinylbenzenesulfonic acid as was in the charge. The following table demonstrates this.

PERCENT VINYLBENZENESULFONIC ACID

| In charge | In polymer |
|---|---|
| 1.0 | 1.4 |
| 2.0 | 2.2 |
| 3.0 | 3.1 |
| 4.0 | 5.0 |
| 10.0 | 10.0 |
| 16.0 | 19.0 |
| 40.0 | 58.0 |

Conversion of the acrylonitrile to polymer is not complete and the vinylbenzenesulfonic acid is so active in polymerization that the resultant copolymers contain in most instances more sulfonate than would have been present had all the acrylonitrile been converted.

*Example IX*

A mixture of distilled deaerated water (750 parts), sodium 4-vinylbenzenesulfonate (15 parts) and acrylonitrile (35 parts) was prepared.

The resulting solution was stirred at 40° C. under nitrogen and a solution of potassium peroxydisulfate (1.48 parts) and sodium bisulfite (0.7 part) in distilled water (20 parts) was added.

After 5 hours the thick solution was added to acetone (1178 parts), and the precipitated polymer was filtered. The polymer was treated with aqueous alkali until 21% of the nitrile groups had hydrolyzed. The product was twice as effective as hydrolyzed polyacrylonitrile in stabilizing soil aggregates.

The following copolymerizations (Examples X to XVI) were made in pressure bottles under nitrogen for 6 hours with agitation:

*Example X*

The polymerization medium was made up of acrylamide (10 parts), a mixture (7 parts) of potassium 4-vinylbenzenesulfonate and potassium 2-vinylbenzenesulfonate, distilled deaerated water (50 parts), potassium peroxydisulfate (0.05 part) and sodium bisulfite (0.025 part).

The product was a rubbery gel which dispersed readily in water. The yield was quantitative. The product was as effective as hydrolyzed polyacrylonitrile for soil conditioning.

*Example XI*

The pressure bottle was charged with vinylidene chloride (15 parts), potassium 4-vinylbenzenesulfonate (4.9 parts), sodium "Lorol" sulfate (0.5 part), distilled water (50 parts), potassium peroxydisulfate (0.1 part) and sodium bisulfite (0.05 part).

The milk-like dispersion was filtered and the polymer was agglomerated by addition of sodium chloride (5 parts). The product was filtered, washed with water (4 times with 25 part portions) and dried. Infrared and sulfur analyses indicated that a considerable part of the polymer was derived from the sulfonate. Films cast from tetramethylurea dyed better with basic dyes than did polyvinylidene chloride.

*Example XII*

In this experiment the charge was made up of vinyl acetate (15 parts), potassium 4-vinylbenzenesulfonate (4.9 parts), sodium "Lorol" sulfate (0.5 part), distilled water (50 parts), potassium peroxydisulfate (0.1 part) and sodium bisulfite (0.05 part).

The milky dispersion was filtered and the polymer was agglomerated by addition of sodium chloride (5 parts). The product was well washed with water (4 times with 250 parts each time) and dried. Infrared and sulfur analyses established that the potassium vinylbenzenesulfonate had copolymerized. Films of the polymer cast from acetone dyed better with basic dyes than did films of polyvinylacetate.

*Example XIII*

The polymerization medium contained styrene (25 parts), potassium vinylbenzenesulfonate (2.8 parts), sodium "Lorol" sulfate (0.5 part), distilled water (50 parts), potassium peroxydisulfate (0.1 part) and sodium bisulfite (0.05 part).

The dispersion was agglomerated by addition of acetone (78 parts) and the polymer washed with water (5 times with 100 part portions) and dried. Infrared and sulfur analyses indicated the presence of considerable sodium vinylbenzenesulfonate in the polymer. The product dyed well with basic dyes.

*Example XIV*

Replacing styrene in Example XIII with methyl acrylate gave a thick dough which was washed with methanol (160 parts), water (3 times with 1000 parts each time) and dried. The product was insoluble in but swollen by N,N-dimethylformamide, tetramethylurea, acetic acid and acetone. Sulfur analysis indicated the presence of considerable potassium vinylbenzenesulfonate.

*Example XV*

The pressure vessel was charged with p-aminostyrene (10 parts), potassium vinylbenzenesulfonate (7 parts), distilled water (25 parts), sulfuric acid (about 5 parts of 0.1 N) and azo catalyst, alpha,alpha'-azo diisobutyroamidine hydrochloride (0.1 part).

There was partial precipitation of the reactants before polymerization. After polymerization, the blue fluorescent liquor was decanted from precipitated polymer, and this polymer was discarded since it was felt not to be a uniform polymer. The liquor was poured into acetone (156 parts) and the precipitated polymer washed with distilled water (1000 parts) in which it was insoluble. The product was also insoluble in 6N sulfuric acid, 5% acetic acid, saturated aqueous potassium chloride, glacial acetic acid and 5N caustic soda. It was derived from both monomers.

*Example XVI*

Terpolymers of potassium vinylbenzenesulfonate, acrylonitrile and 2-vinylpyridine, which polymers were dyeable with both acid and basic dyes, were prepared according to the following recipe: A mixture was made up of distilled deaerated water (1450 parts), potassium vinylbenzenesulfonate (3 parts), acrylonitrile (90.7 parts) and 2-vinylpyridine (5 parts). The pH of the solution was adjusted to 5 by addition of sulfuric acid. A solution of potassium peroxydisulfate (3.0 parts) and sodium bisulfite (1.5 parts) in distilled water (50 parts) was added.

Polymerization was continued at 40° C. under nitrogen for 1.5 hours, and the polymer was then removed by filtration. After washing with distilled water (3 times with 2000 parts each time), the polymer was dried. A total of 77.5 parts of product was obtained. Films of the polymer from N,N-dimethylformamide solution dyed with both acid and basic dyes.

The sulfoarylethylene acid that is used may have the sulfonic acid group in either the ortho, the meta or para position in respect to the vinyl group. The method given in Example I of preparing the monomer using chlorosulfonic acid is very convenient, but other methods, as for example, oxidation of mercaptan groups on an aryl ring, may be used. Similarly the aromatic nucleus may be chosen from a variety. For example, the aromatic nucleus may be a biphenyl or a naphthyl group. The aromatic nucleus may be substituted with other groups in addition to the sulfonic acid groups. For example, there may be alkyl, alkoxy and similar groups on the nucleus. Specific examples of benzenesulfonic acids which may be used include the following: 2-methyl-4-vinyl-, 3-methyl-4-vinyl-, 2-methyl-5-vinyl-, 3,5-dimethyl-6-vinyl-, 2,5-dimethyl-4-vinyl-, 2,5-dimethyl-6-vinyl-, 2,3-dimethyl-6-vinyl-, 3,4-dimethyl-6-vinyl-, 2,4-dimethyl-6-vinyl-, 2,3,5-trimethyl-6-vinyl-, 2-ethyl-4-vinyl-, 3-ethyl-4-vinyl-, 3-ethyl-5-vinyl-, 2,4-diethyl-6-vinyl-, 2,5-diethyl-4-vinyl-, 2,5-diethyl-6-vinyl-, 2-isopropyl-4-vinyl-, 2-isopropyl-6-vinyl-, 3-isopropyl-6-vinyl-, 3-t-butyl-6-vinyl-, 3-sec-butyl-6-vinyl- and 3-cyclohexyl-6-vinylbenzenesulfonic acids.

If a salt of the monomer is to be used in the polymerization, water-soluble salts of the acids are preferred. These salts include the potassium, sodium, lithium, ammonium, amine salts, such as the triethanolamine salt and similar monovalent salts.

The polymers of this invention may be used with the sulfo group in the free acid form, or the sulfonic acid group may be converted to salts by reaction with a variety of bases including sodium, potassium, lithium and ammonium hydroxides or with amines, such as triethanolamine, or by interchange of the polymer in salt form with monomeric salts, such as calcium chloride, barium chloride, aluminum sulfate, aluminum chloride, calcium nitrate, silver nitrate and similar salts. The salts derived from water-soluble bases, such as the sodium, potassium, lithium, ammonium and amine salts, are preferred.

Polymers derived from the sulfoarylethylenes of this invention are highly useful in a number of ways. The homopolymers or polymers derived from a large amount of sulfonic acid-containing monomer are either completely water-soluble or very hydrophilic. Such compounds are very effective soil conditioners. They may be used as prepared, as the free acid or in the salt form.

In addition to the copolymers prepared in the above examples, the sulfoarylethylenes may be polymerized with the following comonomers: methyl vinyl ketone, vinyl chloride, methacrylamide, acrylic acid, methacrylonitrile, acrylyl chloride, butadiene, chloroprene, vinylpyridine, vinylimidazole, vinyloxyethylformamide, divinylbenzene, methylene bisacrylamide, vinylidene cyanide, and any of those given in Jacobson, U. S. Patent No. 2,436,926. In respect to the acrylonitrile copolymers, for textile uses polymers containing a major portion of acrylonitrile are of most interest. Those polymers having 70% or more of acrylonitrile are generally used. Higher acrylonitrile content in the polymers, say about 85% or more, is best and preferred for the advantages in textile properties attending, as for example, strength, insolubility, sunlight resistance and other characteristics. Of these, the copolymers with acrylonitrile are of particular interest since these copolymers are readily dyeable with basic dyes. For example, the polymer prepared in Example II above dissolves readily in N,N-dimethylformamide to give a 20% solution having a viscosity of 90 poises at 120° C. Upon dry spinning this, yarn of very good color is readily obtained and this yarn can be drawn 8 or more times its original length to produce a strong yarn having a tenacity of about five grams per denier. This yarn dyes much better with basic dyes than a comparable yarn prepared with polyacrylonitrile and in addition it is also dyed with dispersed dyes whereas yarns prepared from polyacrylonitrile do not dye with these dyes.

An additional advantage in the acrylonitrile copolymers is the greater thermal stability. For example, when comparative samples of yarns prepared from the polymers of this invention and yarns prepared from polyacrylonitrile are heated for one hour at 160–165° C., the discoloration of the polyacrylonitrile yarns is at least twice as much that of the instant yarns. This increased thermal stability can be detected with as little as one percent of potassium vinylbenzenesulfonate present in the copolymer.

The acrylonitrile copolymers are somewhat more hydrophilic and the moisture absorption of the yarn results in reduced static charge. The static build-up of the yarns of this invention was less than that of polyacrylonitrile and the leakage of charge from the yarns prepared from copolymers of this invention was greater than that of polyacrylonitrile yarns. In fabrication and use of clothing articles prepared from acrylonitrile polymers, these advantages represent distinct advances in the textile field.

Any departure from the above description which conforms to the present invention is intended to be included within the scope of the claims.

We claim:

1. A copolymer obtained by copolymerizing a mixture comprising two vinyl monomers, one of the said monomers being a vinylarenesulfonate selected from the group consisting of vinylarenesulfonic acids and their hydrolyzable water-soluble salts, and the other vinyl monomer being acrylonitrile and being present in the amount of at least 70% of the total monomer mixture, said copolymer having sulfo groups uniformly and definitely located in the said copolymer.

2. The copolymer of claim 1 in the form of a shaped article.

3. The article of claim 2 in the form of a filament.

4. The article of claim 2 in the form of a film.

5. The copolymer of claim 1 in which one of the monomers has the formula:

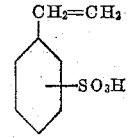

6. The copolymer of claim 1 in which one of the monomers is an o-vinylbenzenesulfonate.

7. The copolymer of claim 1 in which one of the monomers is a p-vinylbenzenesulfonate.

8. The copolymer of claim 1 in which the sulfonate is an alkali metal salt.

9. The copolymer of claim 1 in which acrylonitrile is present in the amount of at least 85% of the combined monomers.

References Cited in the file of this patent

UNITED STATES PATENTS

| | | |
|---|---|---|
| 2,533,210 | Baer | Dec. 12, 1950 |
| 2,616,917 | Coover | Nov. 4, 1952 |
| 2,667,469 | Sauer | Jan. 26, 1954 |

OTHER REFERENCES

Moralli: Bull. Soc. Chem. France, 1953, 1044–1045. Abstracted in C. A. 49, 2347 (1955).

Campaigne et al.: J. Am. Chem. Soc. 68, 880–882 (May 1946).

Wiley et al.: J. Am. Chem. Soc. 76, 720–23 (February 1954).

UNITED STATES PATENT OFFICE
CERTIFICATE OF CORRECTION

Patent No. 2,837,500                                    June 3, 1958

Raymond Joseph Andres et al.

It is hereby certified that error appears in the printed specification of the above numbered patent requiring correction and that the said Letters Patent should read as corrected below.

Column 6, line 1, strike out "The polymerization medium contained styrene (25".

Signed and sealed this 2nd day of September 1958.

(SEAL)
Attest:
KARL H. AXLINE
Attesting Officer

ROBERT C. WATSON
Commissioner of Patents